US008022843B2

(12) United States Patent
Mitchell et al.

(10) Patent No.: US 8,022,843 B2
(45) Date of Patent: Sep. 20, 2011

(54) WIRELESS AIRCRAFT SENSOR NETWORK

(75) Inventors: Bradley J. Mitchell, Snohomish, WA (US); Edwin C. Lim, Woodinville, WA (US)

(73) Assignee: The Boeing Company, Chicago, IL (US)

( * ) Notice: Subject to any disclaimer, the term of this patent is extended or adjusted under 35 U.S.C. 154(b) by 633 days.

(21) Appl. No.: 12/059,171

(22) Filed: Mar. 31, 2008

(65) Prior Publication Data

US 2009/0243895 A1 Oct. 1, 2009

(51) Int. Cl.
*G08B 21/00* (2006.01)
*G01C 23/00* (2006.01)
(52) U.S. Cl. .................. 340/973; 340/945; 340/971
(58) Field of Classification Search .................. 340/945, 340/971, 973
See application file for complete search history.

(56) References Cited

U.S. PATENT DOCUMENTS

| 4,897,883 | A | * | 1/1990 | Harrington | 398/126 |
| 5,241,410 | A | * | 8/1993 | Streck et al. | 398/115 |
| 5,552,780 | A | * | 9/1996 | Knockeart | 340/991 |
| 6,009,356 | A | * | 12/1999 | Monroe | 701/14 |
| 6,415,209 | B1 | | 7/2002 | Reimer | |
| 6,661,386 | B1 | * | 12/2003 | Petros et al. | 343/713 |
| 6,980,768 | B2 | * | 12/2005 | Arend et al. | 455/3.01 |
| 2005/0164666 | A1 | * | 7/2005 | Lang et al. | 455/282 |
| 2006/0090574 | A1 | * | 5/2006 | Moore et al. | 73/862.55 |
| 2007/0057121 | A1 | * | 3/2007 | Callahan et al. | 244/118.5 |
| 2007/0103289 | A1 | | 5/2007 | Dagci | |
| 2007/0276626 | A1 | * | 11/2007 | Bruffey | 702/182 |
| 2008/0167833 | A1 | * | 7/2008 | Matsen et al. | 702/122 |

OTHER PUBLICATIONS

U.S. Appl. No. 11/522,276, filed Sep. 11, 2006, Mitchell.
U.S. Appl. No. 11/684,279, filed Mar. 9, 2007, Mitchell.
U.S. Appl. No. 11/694,013, filed Mar. 30, 2007, Mitchell.
U.S. Appl. No. 11/690,316, filed Mar. 23, 2007, Mitchell.
U.S. Appl. No. 11/862,395, filed Sep. 27, 2007, Mitchell.
08-0188 PCT International Search Report Jul. 8, 2009, pp. 1-16.

* cited by examiner

*Primary Examiner* — Jennifer Mehmood
*Assistant Examiner* — Andrew Bee
(74) *Attorney, Agent, or Firm* — Yee & Associates, P.C.

(57) ABSTRACT

A method and apparatus in a sensor network in an aircraft for collecting data about the aircraft. The sensor network in the aircraft collects the data about the aircraft. The sensor network comprises a set of wireless sensors attached to a first set of locations for the aircraft, a set of wireless routers attached to a second set of locations for the aircraft, and a set of gateways connected to an aircraft data processing system. The set of wireless routers is capable of receiving the data in wireless signals transmitted by the set of wireless sensors. The set of gateways is capable of receiving data in the wireless signals from the set of wireless routers to form received data and is capable of transmitting the received data into the aircraft data processing system.

13 Claims, 10 Drawing Sheets

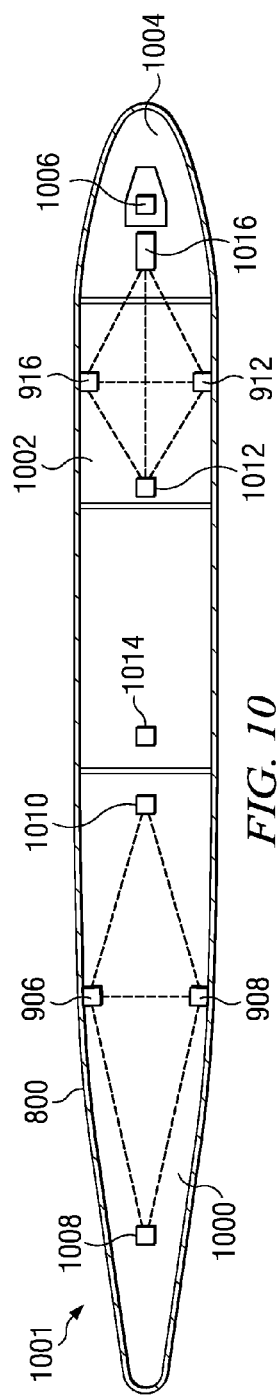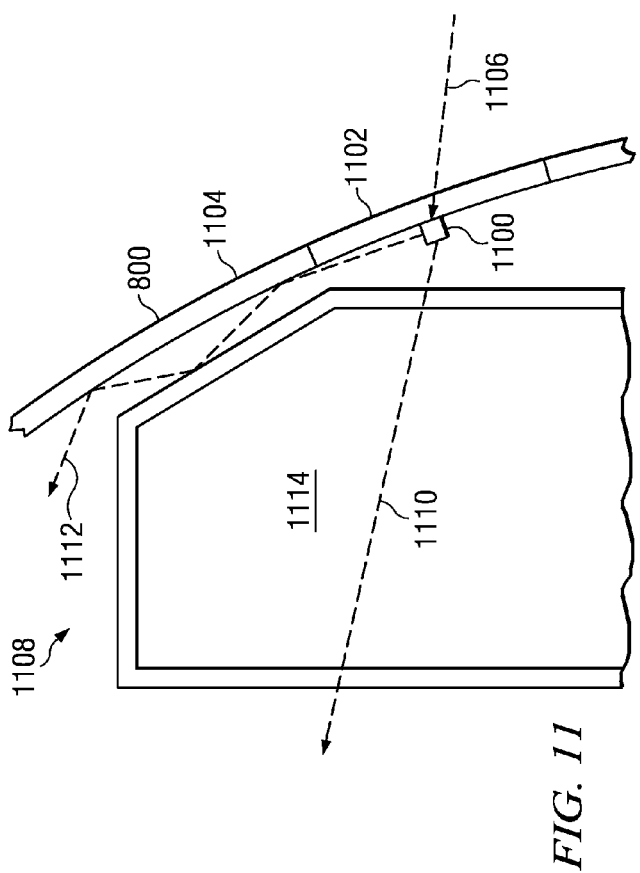

WIRELESS AIRCRAFT SENSOR NETWORK

BACKGROUND INFORMATION

1. Field

The present disclosure relates generally to an improved data processing system and in particularly to a sensor network. Still more particular, the present disclosure relates to a wireless sensor network in an aircraft.

2. Background

Modern aircrafts are extremely complex. For example, an aircraft may have many types of electronic systems on board. A particular electronic system on an aircraft may also be referred to as a line replaceable unit (LRU). Each line replaceable unit may take various forms. A line replaceable unit may be, for example, without limitation, a flight management system, an autopilot, an in-flight entertainment system, an environmental control system, a communications system, a collision avoidance system, a flight controller, and a flight recorder.

These types of systems often rely on the use of sensors to operate. For example, an environmental control system for a passenger cabin in an aircraft may use various temperature sensors and airflow sensors to identify changes that may be needed to maintain a desired environment in the passenger cabin. These sensors are connected to the environmental control system to provide the data needed to maintain a uniform temperature within the cabin. The environmental control system uses this information to control the heating, cooling, and/or airflow within different portions of the passenger cabin. These sensors are connected directly to the environmental control unit to provide the data needed in controlling the environment within the passenger cabin.

Other systems also require data to control various functions within the aircraft. As a result, aircraft today are complex and require an ability to obtain information about various states and conditions in and around the aircraft to function properly.

SUMMARY

The advantageous embodiments provide a method and apparatus in a sensor network in an aircraft for collecting data about the aircraft. In one advantageous embodiment, the sensor network in the aircraft collects the data about the aircraft. The sensor network comprises a set of wireless sensors attached to a first set of locations for the aircraft, a set of wireless routers attached to a second set of locations for the aircraft, and a set of gateways connected to an aircraft data processing system. The set of wireless routers is capable of receiving the data in wireless signals transmitted by the set of wireless sensors. The set of gateways is capable of receiving data in the wireless signals from the set of wireless routers to form received data and is capable of transmitting the received data into the aircraft data processing system.

In another advantageous embodiment, a method is provided for detecting data in an aircraft. The data is detected using a set of wireless sensors attached to a first set of locations for the aircraft to form detected data. The detected data is sent in wireless signals from the set of wireless sensors to a set of wireless routers attached to a second set of locations for the aircraft, wherein the set of wireless routers is capable of receiving the data in the wireless signals transmitted by the set of wireless sensors. The data is routed through the set of wireless routers to a set of gateways connected to an aircraft data processing system to form routed data. The routed data is transmitted from the set of gateways into the aircraft data processing system. The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

FIG. 10 is a diagram illustrating a configuration of routers in a cross sectional view of an aircraft in accordance with an advantageous embodiment;

FIG. 11 is an illustration of a configuration for a wireless router in accordance with an advantageous embodiment;

DETAILED DESCRIPTION

Figure 1:
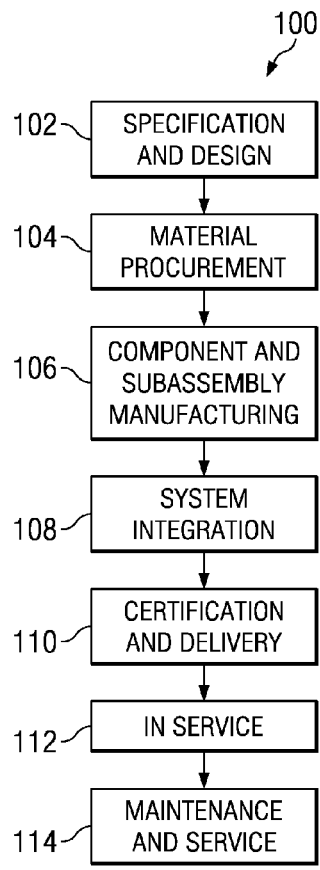
FIG. 1 is a diagram illustrating an aircraft manufacturing and service method in which an advantageous embodiment may be implemented.
Figure 2:
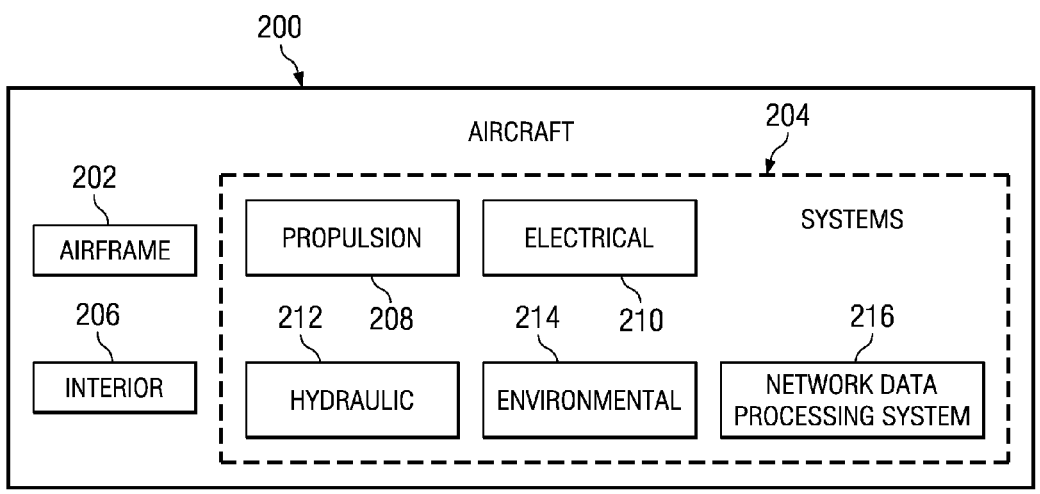
FIG. 2 is a diagram of an aircraft in accordance with an advantageous embodiment.

Referring more particularly to the drawings, embodiments of the disclosure may be described in the context of the aircraft manufacturing and service method 100 as shown in FIG. 1 and aircraft 200 as shown in FIG. 2. Turning first to FIG. 1, a diagram illustrating an aircraft manufacturing and service method is depicted in accordance with an advantageous embodiment. During pre-production, exemplary aircraft manufacturing and service method 100 may include specification and design 102 of aircraft 200 in FIG. 2 and material procurement 104.

During production, component and subassembly manufacturing 106 and system integration 108 of aircraft 200 in FIG. 2 takes place. Thereafter, aircraft 200 in FIG. 2 may go through certification and delivery 110 in order to be placed in service 112. While in service by a customer, aircraft 200 in FIG. 2 is scheduled for routine maintenance and service 114, which may include modification, reconfiguration, refurbishment, and other maintenance or service.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of venders, subcontractors, and suppliers; and an operator may be an airline, leasing company, military entity, service organization, and so on.

With reference now to FIG. 2, a diagram of an aircraft is depicted in which an advantageous embodiment may be implemented. In this example, aircraft 200 is produced by aircraft manufacturing and service method 100 in FIG. 1 and may include airframe 202 with a plurality of systems 204 and interior 206. Examples of systems 204 include one or more of propulsion system 208, electrical system 210, hydraulic system 212, environmental system 214 and network data processing system 216. Any number of other systems may be included. Although an aerospace example is shown, different advantageous embodiments may be applied to other industries, such as the automotive industry.

Apparatus and methods embodied herein may be employed during any one or more of the stages of aircraft manufacturing and service method 100 in FIG. 1. For example, components or subassemblies produced in component and subassembly manufacturing 106 in FIG. 1 may be fabricated or manufactured in a manner similar to components or subassemblies produced while aircraft 200 is in service 112 in FIG. 1. Also, one or more apparatus embodiments, method embodiments, or a combination thereof may be utilized during production stages, such as component and subassembly manufacturing 106 and system integration 108 in FIG. 1, for example, without limitation, by substantially expediting the assembly of or reducing the cost of aircraft 200. Similarly, one or more of apparatus embodiments, method embodiments, or a combination thereof may be utilized while aircraft 200 is in service 112 or during maintenance and service 114 in FIG. 1.

As an example, the different advantageous embodiments may be implemented in network data processing system 216. Network data processing system 216 may be implemented during system integration 108. Further, portions of network data processing system 216 may be added or modified during maintenance and service 114 to include the different advantageous embodiments.

The different advantageous embodiments recognize that line replaceable units that require data from sensors are designed in an inefficient manner. Currently, the different advantageous embodiments recognize that sensors used in aircraft are directly connected to the line replaceable unit receiving the data. Further, the different advantageous embodiments recognize that as the number of sensors increase, the amount of wiring also increases. This increase in wiring leads to weight increases and complexities in routing the wires and the sensors to the line replaceable units.

Further, when the configuration of an aircraft changes, the current locations of the sensors may no longer be feasible with the new configuration. As a result, sensors have to be moved. The different advantageous embodiments recognize that this type of rearrangement may be difficult and costly. Changes in the locations of sensors require rerunning wires within the aircraft for the new locations. This rerunning of wires may require removal of various panels and components in the aircraft.

Thus, the different advantageous embodiments provide a sensor network in an aircraft for collecting data about the aircraft. This sensor network includes a set of wireless sensors attached to a first set of locations for the aircraft. A set used herein refers to one or more items. For example, a set of wireless sensors are one or more wireless sensors. The network also includes a set of wireless routers attached to a second set of locations for the aircraft in which the set of wireless routers are capable of receiving data in wireless signals transmitted by the set of wireless sensors.

Further, the sensor network in the advantageous embodiments also includes a set of gateways connected to an aircraft data processing system. The set of gateways is capable of receiving data in the wireless signals from the set of wireless routers to form received data and is capable of transmitting the received data into the aircraft network data processing system.

This aircraft data processing system may be a line replaceable unit, such as, for example, a central server module, an electronic flight bag, a cabin services system, an environmental control system, an in-flight electronic entertainment system, a navigation system, a flight controller, a collision avoidance system, or some other suitable system. Depending on the particular implementation, the gateway may be directly connected to the aircraft data processing system. In other advantageous embodiments, the gateway may send the information to the aircraft data processing system across a network on which the data processing system is located.

Figure 3:
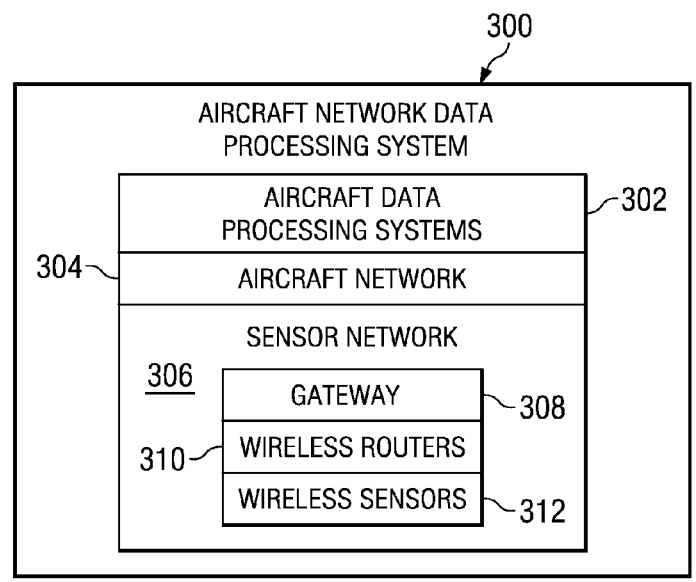
FIG. 3 is a functional block diagram of an aircraft network data processing system in accordance with an advantageous embodiment.

Turning now to FIG. 3, a functional block diagram of an aircraft network data processing system is depicted in accordance with an advantageous embodiment. Aircraft network data processing system 300 is an example of network data processing system 216 in aircraft 200 in FIG. 2. In this example, aircraft network data processing system 300 includes aircraft data processing systems 302, aircraft network 304, and sensor network 306. In these illustrative examples, sensor network 306 may be a wireless sensor network. Sensor network 306 may include gateway 308, wireless routers 310, and wireless sensors 312.

Aircraft data processing systems 302 may be, for example, the computers, controls, and other devices that control various operations and environments within an aircraft. Aircraft network 304 provides connections between aircraft data processing systems 302. Further, aircraft network 304 also provides a connection to sensor network 306.

In these examples, wireless sensors 312 may gather information about the environment for the aircraft. Wireless sensors 312 may be attached to locations for the aircraft. Attached to locations in these examples means that wireless sensors 312 may be attached to locations inside and outside of the aircraft. In some embodiments, rather than being attached to locations, one or more wireless sensors 312 may be placed on or in a location. Wireless sensors 312 may include, for example, wireless passenger control units, brake temperature sensors, tire pressure sensors, light control switches, duct overheat sensors, aircraft health monitoring sensor, cabin temperature sensors, flight test instrumentation, door sensors, hatch sensors, cabin monitoring sensors, and other suitable types of sensors. These wireless sensors 312 may sense data about the environment and are intended to sense a condition or status of various features of the aircraft. In these illustrative examples, this data may be transmitted by wireless sensors 312 to wireless routers 310 through a transmission using wireless signals. Wireless routers 310 are arranged in a manner to relay or transfer data received from sensors and/or other routers in wireless routers 310 to gateway 308. In some advantageous embodiments, wireless sensors 312 may directly send data to gateway 308.

Gateway 308 serves as an interface to send data to aircraft data processing systems 302 across aircraft network 304. The data gathered by wireless sensors 312 may then be used by an aircraft data processing system in aircraft data processing systems 302 to perform various operations. These operations include, for example, maintaining cabin pressure, controlling control surfaces, generating alerts, and other suitable operations.

In these different illustrative examples, the description and arrangement of aircraft network data processing system 300 is not meant to imply architectural limitations in a manner in which various components may be implemented. For example, sensor network 306 may not include only wireless routers 310 and wireless sensors 312. As another example, sensor network 306 also may include wired sensors, routers, and gateways. As another example, although only gateway 308 is illustrated, additional gateways may be present in sensor network 306 depending on the particular implementation. These components may be existing components in which the wireless components are additions or supplements.

In other advantageous embodiments, a limited number of wired routers, sensors, and gateways may be present to take into account conditions in which wireless transmissions may not be feasible for certain areas or locations. Further, a combination of a wired device connected to a wireless device also may be used within sensor network 306 in some advantageous embodiments.

Figure 4:
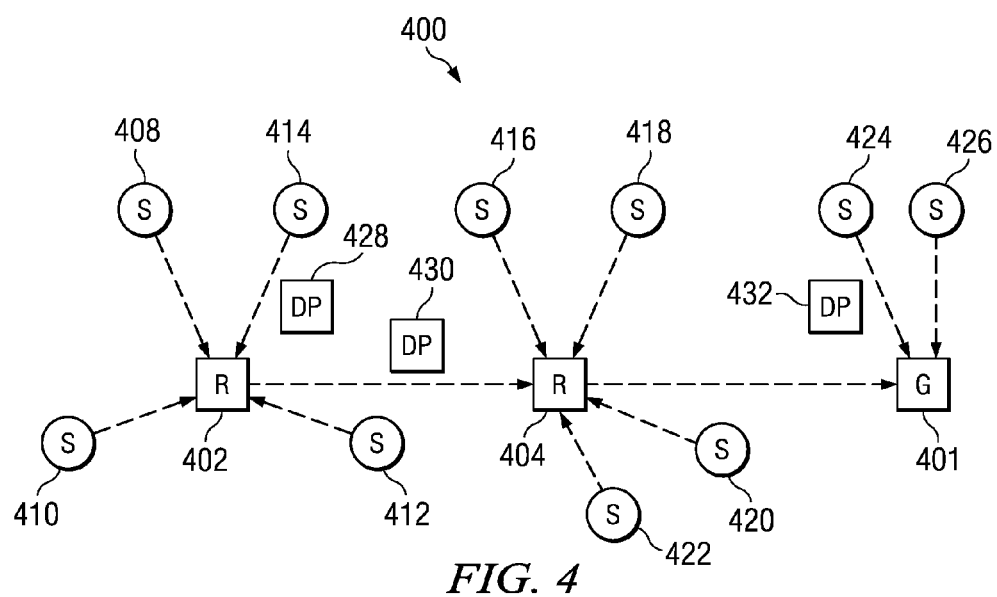
FIG. 4 is a diagram of a sensor network in accordance with an advantageous embodiment.

Turning now to FIG. 4, a diagram of a sensor network is depicted in accordance with an advantageous embodiment. In the depicted example, sensor network 400 includes gateway 401, wireless router 402, and wireless router 404. Additionally, sensor network 400 also includes wireless sensors 408, 410, 412, 414, 416, 418, 420, 422, 424, and 426.

In this illustrative example, wireless sensors 408, 410, 414, and 412 transmit wireless signals containing data to wireless router 402. In turn, wireless router 402 transmits signals containing the received data to wireless router 404.

Wireless sensors 416, 418, 420, and 422 transmit wireless signals containing data to wireless router 404. Wireless router 404 sends this data in wireless signals to gateway 401. Further, wireless sensors 424 and 426 directly send wireless signals to gateway 401 containing data. The different sensors may transmit data in radio frequency signals. In these examples, the data takes the form of data packets (DP), such as data packets 428, 430, and 432.

Further, gateway 406 may route the data to the appropriate data processing system. In these examples, gateway 406 also may log data received from the sensor with time stamps. In these examples, the data is received in the form of data packets from the different wireless sensors. Gateway 406 also may provide a user interface to indicate what event or activities have occurred. These activities may include a printout or visual display. Further, gateway 401 also may transmit an activity log to maintenance, operations, security, or other support personnel through an onboard or off board system.

Gateway 401 may allow personnel to control the sensor system. Various operations that may be performed to control the sensor system include resetting the system memory to begin logging new activity from a based time line, allowing personnel or other systems to define various phases of operations. These various phases may include, for example, passengers onboard, cabin cleaning, cabin inspection, or some other suitable phase. These different phases may result in a different treatment of the sensor data, and in some cases, turning off the wireless sensors and/or not passing data along to other data processing systems during a specific phase(s).

Further, gateway 401 may associate individual sensor transmitter identification numbers with specific sensor locations.

Wireless routers 402 and 404 make take various forms. For example, wireless routers 402 and 404 may be a simple computer that simply repeats data packets received from wireless sensors. In other advantageous embodiments, these routers may be a mesh network router, such as, for example, an XBee® ZNet 2.5 OEM FR Module, which is available from Digi International, Inc.

Wireless sensors 408, 410, 412, 414, 416, 418, 420, 422, 424, and 426 may be implemented using wireless sensors such as STM110, which is available from EnOcean, GmbH. Gateway 401 is a device used to interface with an aircraft data processing system or aircraft network. Gateway 401 may be, for example, a computer or other device that converts the data from a form transmitted by the wireless sensors to a format used by the aircraft data processing systems. An example of a gateway that may be used to implement gateway 401 is a ConnectPort X8, which is available from Digi International, Inc.

Figure 5:
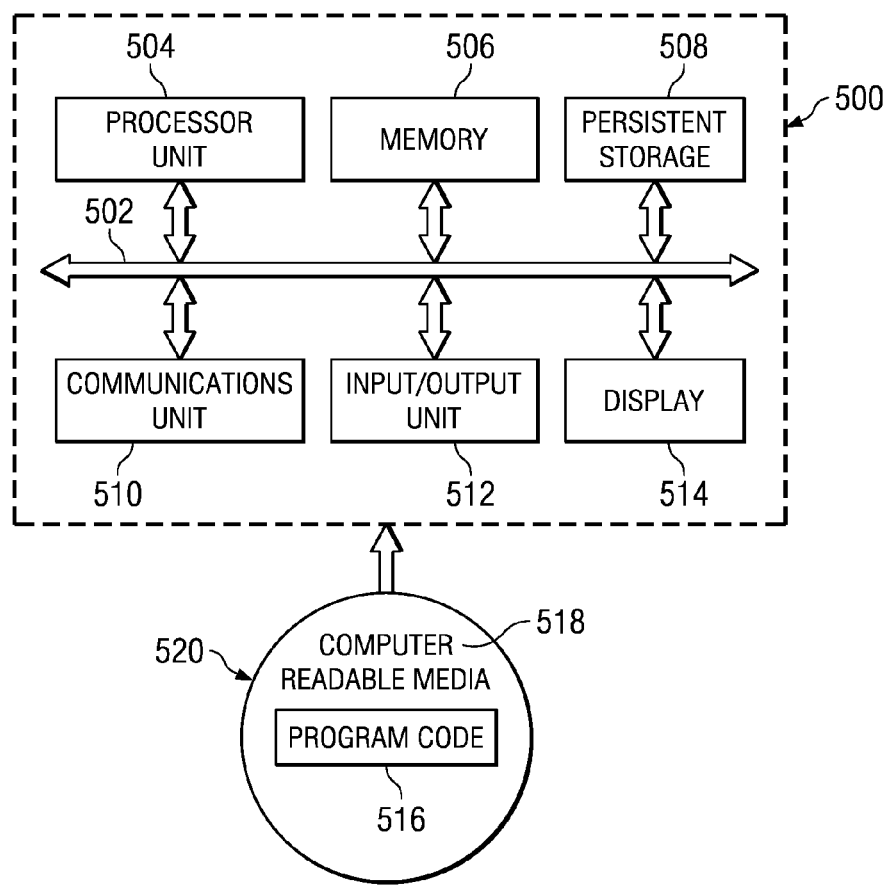
FIG. 5 is a diagram of a data processing system in accordance with an advantageous embodiment.

Turning now to FIG. 5, a diagram of a data processing system is depicted in accordance with an advantageous embodiment. Data processing system 500 may be used to implement components, such as gateway 406 in FIG. 4, wireless router 404 in FIG. 4, and aircraft data processing systems 302 in FIG. 3. In this illustrative example, data processing system 500 includes communications fabric 502, which provides communications between processor unit 504, memory 506, persistent storage 508, communications unit 510, input/output (I/O) unit 512, and display 514.

Processor unit 504 serves to execute instructions for software that may be loaded into memory 506. Processor unit 504 may be a set of one or more processors or may be a multiprocessor core, depending on the particular implementation. Further, processor unit 504 may be implemented using one or more heterogeneous processor systems in which a main processor is present with secondary processors on a single chip. As another illustrative example, processor unit 504 may be a symmetric multi-processor system containing multiple processors of the same type.

Memory 506 and persistent storage 508 are examples of storage devices. A storage device is any piece of hardware that is capable of storing information either on a temporary basis and/or a permanent basis. Memory 506, in these examples, may be, for example, a random access memory or any other suitable volatile or non-volatile storage device. Persistent storage 508 may take various forms depending on the particular implementation. For example, persistent storage 508 may contain one or more components or devices. For example, persistent storage 508 may be a hard drive, a flash memory, a rewritable optical disk, a rewritable magnetic tape, or some combination of the above. The media used by persistent storage 508 also may be removable. For example, a removable hard drive may be used for persistent storage 508.

Communications unit 510, in these examples, provides for communications with other data processing systems or devices. In these examples, communications unit 510 is a network interface card. Communications unit 510 may provide communications through the use of either or both physical and wireless communications links.

Input/output unit 512 allows for input and output of data with other devices that may be connected to data processing system 500. For example, input/output unit 512 may provide a connection for user input through a keyboard and mouse. Further, input/output unit 512 may send output to a printer. Display 514 provides a mechanism to display information to a user.

Instructions for the operating system and applications or programs are located on persistent storage 508. These instructions may be loaded into memory 506 for execution by processor unit 504. The processes of the different embodiments may be performed by processor unit 504 using computer implemented instructions, which may be located in a memory, such as memory 506. These instructions are referred to as program code, computer usable program code, or computer readable program code that may be read and executed by a processor in processor unit 504. The program code in the different embodiments may be embodied on different physical or tangible computer readable media, such as memory 506 or persistent storage 508.

Program code 516 is located in a functional form on computer readable media 518 that is selectively removable and may be loaded onto or transferred to data processing system 500 for execution by processor unit 504. Program code 516 and computer readable media 518 form computer program product 520 in these examples. In one example, computer readable media 518 may be in a tangible form, such as, for example, an optical or magnetic disc that is inserted or placed into a drive or other device that is part of persistent storage 508 for transfer onto a storage device, such as a hard drive that is part of persistent storage 508. In a tangible form, computer readable media 518 also may take the form of a persistent storage, such as a hard drive, a thumb drive, or a flash memory that is connected to data processing system 500. The tangible form of computer readable media 518 is also referred to as computer recordable storage media. In some instances, computer readable media 518 may not be removable.

Alternatively, program code 516 may be transferred to data processing system 500 from computer readable media 518 through a communications link to communications unit 510 and/or through a connection to input/output unit 512. The communications link and/or the connection may be physical or wireless in the illustrative examples. The computer readable media also may take the form of non-tangible media, such as communications links or wireless transmissions containing the program code.

The different components illustrated for data processing system 500 are not meant to provide architectural limitations to the manner in which different embodiments may be implemented. The different illustrative embodiments may be implemented in a data processing system including components in addition to or in place of those illustrated for data processing system 500. Other components shown in FIG. 5 can be varied from the illustrative examples shown.

As one example, a storage device in data processing system 500 is any hardware apparatus that may store data. Memory 506, persistent storage 508 and computer readable media 518 are examples of storage devices in a tangible form.

In another example, a bus system may be used to implement communications fabric 502 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 506 or a cache such as found in an interface and memory controller hub that may be present in communications fabric 502.

Figure 6:
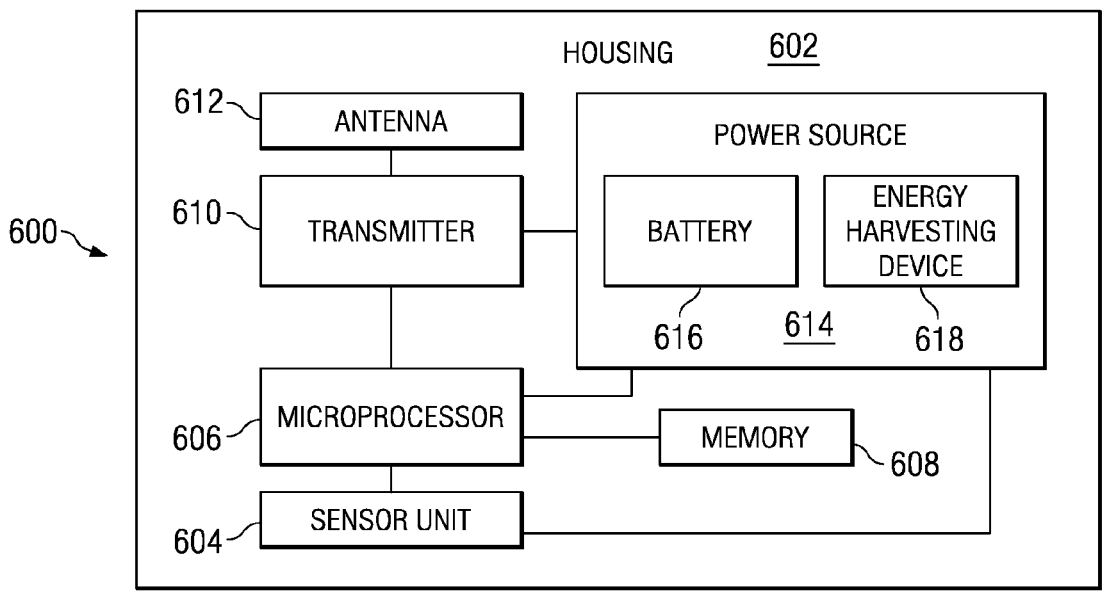
FIG. 6 is a block diagram of a wireless sensor in accordance with an advantageous embodiment.

Turning now to FIG. 6, a block diagram of a wireless sensor is depicted in accordance with an advantageous embodiment. In this example, wireless sensor 600 includes housing 602, which contains sensor unit 604, microprocessor 606, memory 608, transmitter 610, antenna 612, and power source 614. Sensor unit 604 may contain a set of sensors.

Data may be temporarily stored in memory 608 until transmitted by transmitter 610 over antenna 612. In these examples, transmitter 610 transmits wireless signals over antenna 612 in the form of radio frequency signals. Further, transmitter 610 also is associated with a unique identification number that is included with a transmitted data packet to allow a gateway to distinguish between different sensors and identify sensor locations. Microprocessor 606 controls the sampling or receipt of data from sensor unit 604. Microprocessor 606 may be configured to obtain and transmit data from sensor unit 604 based on an event.

These events may be periodic or not periodic. For example, the periodic event may be a schedule in which cabin air temperature is sensed every ten seconds. In other advantageous embodiments, data may be sensed by an external event, such as the physical opening of a door.

Further, wireless sensor 600 also may send data based on these events, and also send data at least periodically to indicate that the sensor is still alive.

Sensor unit 604 may take various forms. For example, without limitation, sensor unit 604 may be a temperature sensor, a switch that is associated with a door or other portal, a biometric unit, an airflow detector, or some other suitable transducer or sensor device.

In these examples, power source 614 provides power to transmitter 610, microprocessor 606, memory 608, and sensor unit 604 for the various operations that are needed. In some advantageous embodiments, power source 614 may be only connected to selected components while other components may be provided power through connections to the power components.

Power source 614 may be, for example, battery 616 and/or energy harvesting device 618. Energy harvesting device 618 may be, for example, a photovoltaic device that generates electrical power when exposed to a light source, such as sunlight or cabin lighting. In other embodiments, energy harvesting device 618 may be, for example, a vibration harvesting device. This type of device may be, for example, a cantilevered piezoelectric beam, which generates electrical power when exposed to aircraft or operational vibration.

Another non-limiting example of an implementation for energy harvesting device 618 is a thermoelectric device. This type of device generates electrical power when exposed to a thermal gradient. This thermal gradient may be, for example, a hot hydraulic line in ambient air or a thermal gradient across an aircraft insulation blanket.

Energy harvesting device 618 may provide power when various conditions are present. The collusion of battery 616 may provide power to wireless sensor 600 if other conditions are not present to allow energy harvesting device 618 to generate power. Further, energy harvesting device 618 also may charge battery 616.

In some applications, a capacitor or a super-capacitor may be used in lieu of battery 616 to provide power to the various components. This capacitor or super-capacitor may be used in collusion with the energy harvesting device 618.

In this manner, wireless sensor 600 may not require any wiring in the aircraft. Further, no aircraft power or data wiring is required for the normal operation of these devices. As a result, power requirements and weight from wiring sensors are not incurred. This type of wireless sensor also makes it easy to change the locations of sensors when the aircraft is reconfigured. Further, the use of this type of sensor makes it easy to add sensor networks to already existing aircraft.

In these examples, the wireless sensors are configured in a star network topology in which the different wireless sensors send data to a central node, such as one of the routers. The routers are configured in a wireless mesh network configuration. This configuration provides at least two pathways of communication to each node and may send information back and forth. Further, routes are created between nodes only as needed to transmit information.

Figure 7:
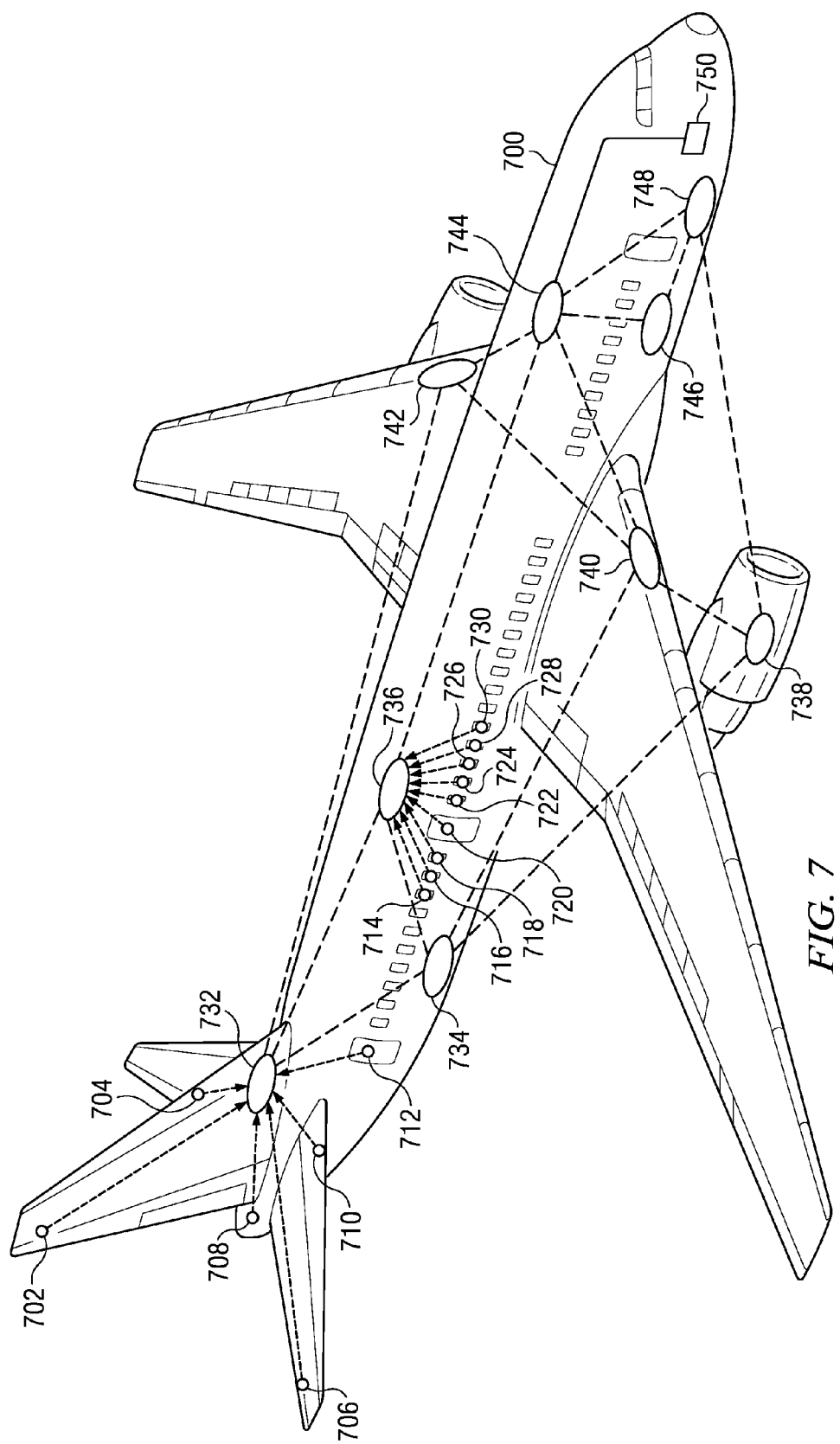
FIG. 7 is a diagram illustrating a sensor network layout for an aircraft in accordance with an advantageous embodiment.

With reference now to FIG. 7, a diagram illustrating a sensor network layout for an aircraft is depicted in accordance with an advantageous embodiment. In this example, aircraft 700 may include wireless sensors 702, 704, 706, 708, 710, 712, 714, 716, 718, 720, 722, 724, 726, 728, and 730. The sensor network also includes wireless routers 732, 734, 736, 738, 740, 742, 744, 746, and 748. This sensor network also includes gateway 750.

As can be seen, the different wireless sensors may be located inside and outside of the aircraft. In these examples, wireless sensor 702, 704, 706, 708, 710, and 712 are located on the exterior of aircraft 700. Wireless sensors 714, 716, 718, 720, 722, 724, 726, 728, and 730 are located on the interior of the aircraft. The different wireless routers may be located on the interior or exterior of the aircraft depending on the particular implementation. In these examples, wireless routers 732, 738, 740, 742 and 748 are located on the exterior of aircraft 700. Wireless routers 734, 736, 744, and 746 are located inside the aircraft. Also, in these examples, gateway 750 is located inside the aircraft 700. Interior locations may include, for example, passenger cabin, cabin ceiling areas, cargo holds and electrical equipment centers. Exterior locations may include, for example, landing gear wheel wells, engine struts or within the empennage. Also, both wireless and wired connections may be provided from a router sending data directly to gateway 750 in these examples. Multiple routers may send data to gateway 750 provide redundancy.

Figure 8:
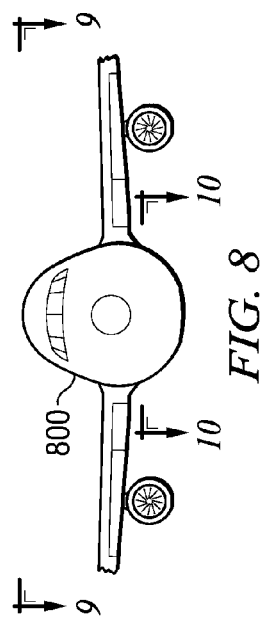
FIG. 8 is an illustration of a configuration of routers in a cross-sectional view of an aircraft in accordance with an advantageous embodiment.

Turning now to FIG. 8, an illustration of a configuration of routers in a cross-sectional view of an aircraft is depicted in accordance with an advantageous embodiment. In this example, aircraft 800 may have routers in different locations for aircraft 800. In particular, section lines X-X and Y-Y are sections shown in FIGS. 9 and 10 in which routers may be located on different levels of aircraft 800. The architecture of routers in aircraft 800 is designed to provide a transfer of data amongst various areas of an aircraft, including from one level of an aircraft to another level of an aircraft, to an aircraft data processing system or other device for processing or use.

Figure 9:
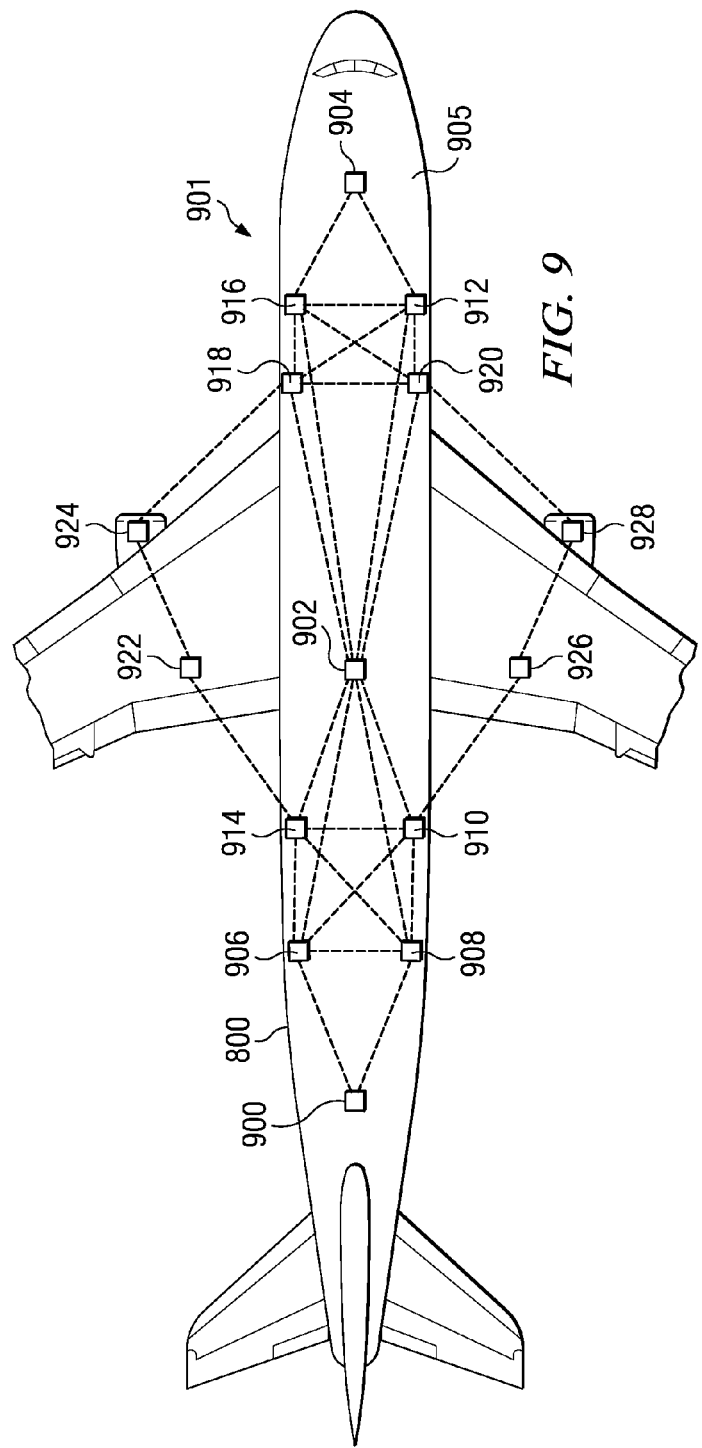
FIG. 9 is an aircraft shown in a top cross sectional view in accordance with an advantageous embodiment.

With reference now to FIG. 9, aircraft 800 is shown in a top cross sectional view along section X-X in accordance with an advantageous embodiment. In this example, layout 901 is a first level in aircraft 800 in which the routers include overhead routers 900, 902, and 904. These routers are located in the passenger cabin 905. These routers may be located on the ceiling of the passenger cabin 905. In some advantageous embodiments, the routers may be located inside the crown above the cabin. In yet other advantageous embodiments, the routers may be located on cabin stowage bin supports. In this view, aircraft 800 also includes return air grill routers 906, 908, 916, and 912. These routers are located in or approximate to the return air grill in the passenger cabin. Of course, these routers may be located in any location that allows these routers to receive data in wireless signals from one level of the aircraft and transmit the data in wireless signals to another level of the aircraft.

Window routers 914, 910, 918, and 920 also are present in aircraft 800. These window routers may be located in or attached to windows and/or in window plugs in portals for aircraft 800.

Strut routers 922, 924, 926, and 928 are located on the struts or engines on the exterior of aircraft 800 in these examples. The strut routers may receive data from sensors located on the exterior of aircraft 800 and route this data inside aircraft 800 by sending the data to the different window routers, such as window routers 914, 910, 918, and/or 920. These window routers may then route data to the return air grill routers or other routers within the airplane. The different window routers also may receive data directly from sensors located on the outside of aircraft 800. The overhead routers receive data from sensors located inside aircraft 800 and route the data to the return air grill routers or other routers within the airplane. In a mesh network configuration, in the advantageous embodiments, the routers are designed to route the data amongst themselves towards Gateway 1016 as referenced in FIG. 10 below. The connections between routers is determined amongst themselves and possibly with some coordination from the Gateway 1016 in FIG. 10. These connections may change dynamically as various links are blocked or interfered within a changing radio frequency environment.

The connections shown in FIGS. 9 and 10 are examples of some possible configurations of connections that may be established. For example, data from strut router 922 may make its way to Gateway 1016 in FIG. 10 via strut router 924, window router 918, and grill router 912. If window router 918 failed for some reason, the path may dynamically change to strut router 922 to window router 914, and grill router 912, skipping over head router 902 and window router 920 if signal is strong enough, to gateway 1016 in FIG. 10.

In these examples, the return air grill routers function to exchange the data between the level of layout 901 and a lower level in the aircraft as illustrated in FIG. 10 below. Further, the return air grill routers also may receive data directly from sensors that may be present in the cabin.

With reference now to FIG. 10, a diagram illustrating a configuration of routers in a cross sectional view of an aircraft is depicted in accordance with an advantageous embodiment. In this example, a view along lines Y-Y is presented for aircraft 800. As depicted, layout 1001 is for a lobe of aircraft 800 located below the cabin floor of aircraft 800 in these examples. The lobe of aircraft 800 is a lower level of the aircraft with respect to passenger cabin.

This lower portion of aircraft 800 includes aft cargo hold 1000, forward cargo hold 1002, and electronic bay 1004. This portion of aircraft 800 includes nose wheel well router 1006, cargo bay router 1008, cargo bay router 1010, cargo bay router 1012, and main gear wheel well router 1014. Additionally, gateway 1016 also is located on this level of aircraft 800. Cargo bay routers 1008 and 1010 are located within aft cargo hold 1000. Cargo bay router 1012 is located within forward cargo hold 1002.

Gateway 1016 is located within electronic bay 1004 of these examples. The different cargo bay routers may receive data from sensors located within the cargo bays, floor beams, and other nearby areas and route that information to gateway 1016.

Main gear wheel well router 1014 and nose gear wheel well router 1006 may receive data from sensors located on the exterior of aircraft 800. In these examples, this data may be received from sensors located on the lower part of the aircraft. Further, these routers may receive/transmit data from/to routers on the exterior aircraft 800, such as strut routers 922, 924, 926, and 928 in FIG. 9.

In these examples, the different return air grill routers also function to move data from one level of aircraft 800 to another level of aircraft 800, such as between the upper level of aircraft 800 in FIG. 9 and the lower level of aircraft 800 in FIG. 10. This configuration allows data to make its way amongst upper level and lower level meshed routers to gateway 1016.

For example, return air grill router 908 may receive data from different routers, such as cargo bay router 1008. Further, return air grill router 908 also may receive data directly from sensors located in the cargo bay 1000. This data may then be transmitted to overhead router 902. This information may then be sent directly or indirectly to gateway 1016 through return air grill router 912. A wireless path may not be between cargo bay router 1010 and cargo bay router 1012 due to the main landing gear wheel well and fuel tank at the center of the plane. Thus, sensor data from aft lower lobe makes its way to gateway 1016 by first having to go up to the upper level illustrated by layout 901 and then back down to the lower level illustrated by layout 1001 via the return air grill routers.

In this manner, the configuration of routers as shown by layouts 901 and 1001 in aircraft 800 allows for the transfer of data from any level of aircraft 800 to the lower level in which gateway 1016 is located. Although only two levels are shown in these examples, other advantageous embodiments may include additional levels of routers. For example, if aircraft 800 has multiple decks for passengers, routers may be positioned to move data from any level towards the gateway located in the lower level.

With reference now to FIG. 11, an illustration of a configuration for a wireless router is depicted in accordance with an advantageous embodiment. In this example, wireless router 1100 is an example of a window router. Wireless router 1100 is attached to, embedded in, or part of window plug 1102 in these examples. Window plug 1102 is mounted in fuselage 1104. Window plug 1102 is transparent to wireless signals. In other words, window plug 1102 may allow the transmission of wireless signals to pass through window plug 1102. In these examples, fuselage 1104 is opaque with respect to wireless signals. In other words, wireless signals cannot be transmitted through fuselage 1104.

In these illustrative examples, wireless router 1100 is capable of receiving wireless signals from another wireless router or wireless sensor located outside of the aircraft. In this example, wireless router 1100 may receive wireless signals transmitted along path 1106. Wireless router 1100 may retransmit the wireless signal into interior 1108. Wireless router 1100 retransmits the wireless signal along path 1110 and/or path 1112. The path along which the wireless signal is retransmitted depends on whether monument 1114 is transparent or opaque with respect to wireless signals.

A material is transparent to a wireless signal if the material passes a wireless signal. A material is considered opaque with respect to wireless signals if the material does not allow a wireless signal to pass through the material. Monument 1114 may be, for example, a laboratory, a galley, a closet, or some other structure within interior 1108 of aircraft 800. Wireless signal uses path 1110 if monument 1114 is transparent with respect to wireless signals. Path 1112 is used to retransmit the wireless signal if monument 1114 is opaque with respect to wireless signals, particularly if monument 1114 is reflective with respect to wireless signals.

Figure 12:
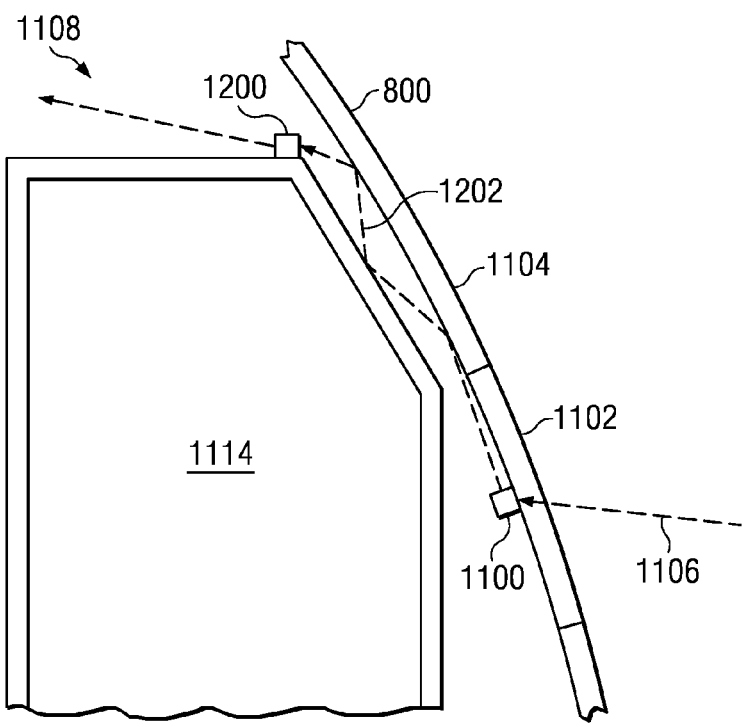
FIG. 12 is an illustration of another configuration for transmitting wireless signals in accordance with an advantageous embodiment.

With reference now to FIG. 12, an illustration of another configuration for transmitting wireless signals is depicted in accordance with an advantageous embodiment. As depicted, wireless router 1100 transmits the wireless signal received along path 1106 to wireless router 1200 along path 1202 into interior 1108 of aircraft 800. In this example, monument 1114 is opaque to wireless signals. This configuration of wireless router 1100 allows for the signal to be transmitted around or past this opaque structure.

Figure 13:
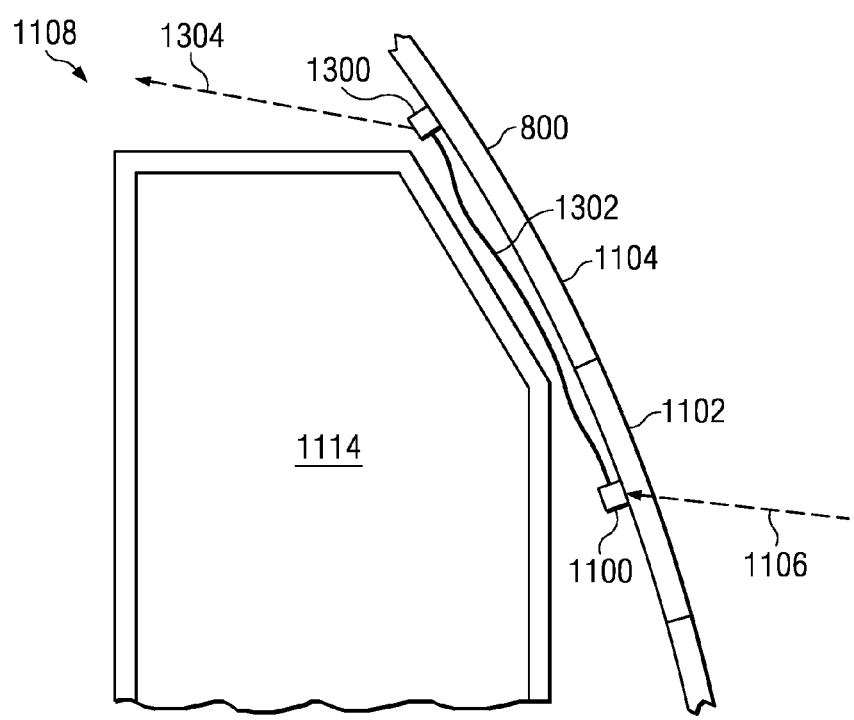
FIG. 13 is another configuration of routers in accordance with an advantageous embodiment.

In FIG. 13, another configuration of routers is depicted in accordance with an advantageous embodiment. In this example, wireless router 1100 is connected to wireless router 1300 through wire 1302. These two routers are wireless routers in a sense that wireless router 1100 receives wireless signals along path 1106.

These signals may then be transmitted through wire 1302 to wireless router 1300. In turn, wireless router 1300 then transmits the data in a wireless signal along path 1304. This type of configuration also provides an ability to route data around objects through which wireless signals cannot be transmitted.

Figure 14:
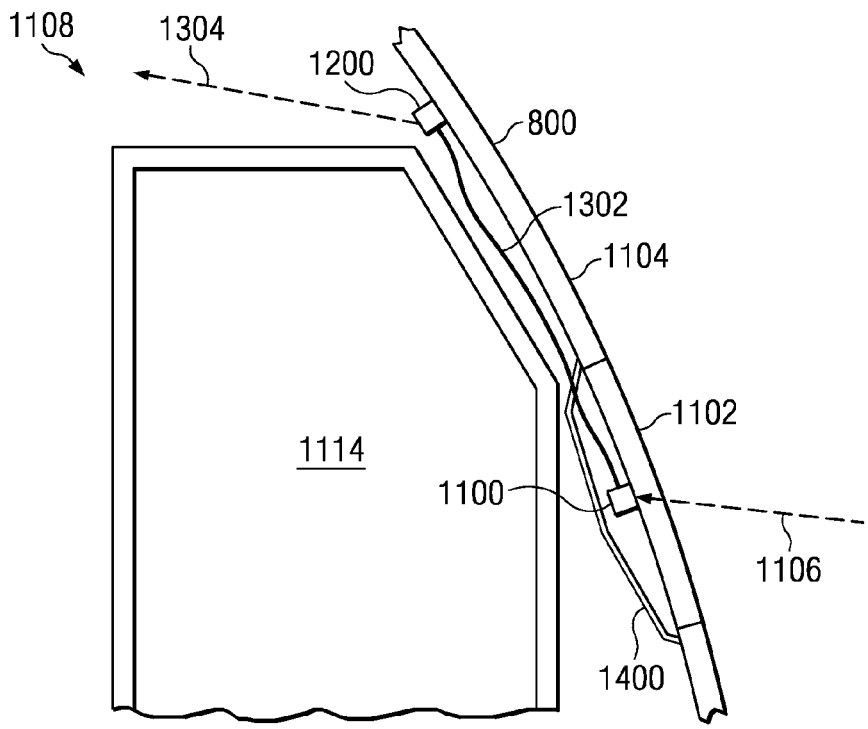
FIG. 14 is yet another configuration of a router in accordance with an advantageous embodiment.

With reference now to FIG. 14, yet another configuration of a router is depicted in accordance with an advantageous embodiment. In this example, the same configuration of routers is used as in FIG. 13. This configuration includes an addition of opaque shield 1400. Opaque shield 1400 prevents wireless signals such as those transmitted along path 1106 from reaching the interior 1108 of aircraft 800.

In this manner, the signals retransmitted into interior 1108 are those received by router 1100. Other signals originating from the exterior of aircraft 800 do not enter interior 1108 of aircraft 800. Likewise, wireless signals originating from interior 1108 of aircraft 800 do not exit to the exterior of aircraft 800. In this manner, aircraft 800 may be shielded from unwanted wireless signals.

Figure 15:
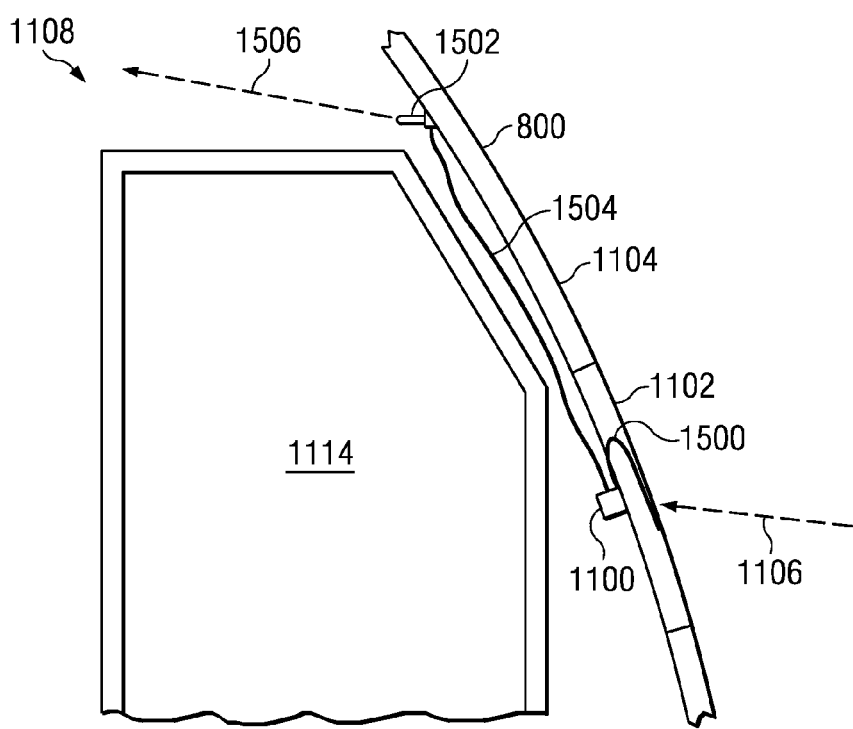
FIG. 15 is an illustration of still another configuration for a router in accordance with an advantageous embodiment.

Turning now to FIG. 15, an illustration of still another configuration for a router is depicted in accordance with an advantageous embodiment. In this example, router 1500 is connected to antenna 1502 through wire 1504. In this manner, radio frequency signals received along path 1106 may be retransmitted through antenna 1502 along path 1506 into interior 1108 of aircraft 800. This configuration provides another configuration to send signals into interior 1108 of the aircraft when an opaque monument, such as monument 1114 is present by window plug 1102.

Figure 16:
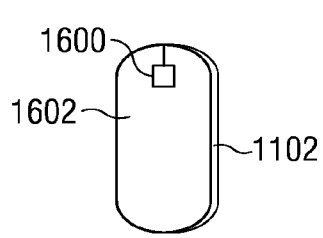
FIG. 16 is an illustration of a router with an antenna in accordance with an advantageous embodiment.
Figure 17:
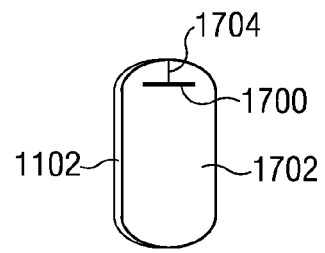
FIG. 17 is an illustration of a radio on a window plug in accordance with an advantageous embodiment.

Turning now to FIG. 16, an illustration for a router is depicted in accordance with an advantageous embodiment. In this example, radio 1600 is shown on interior side 1602 of window plug 1102. In this example, radio 1600 is a portion of wireless router 1100 in FIG. 15. In FIG. 17, an illustration of an antenna for a router is depicted in accordance with an advantageous embodiment. Antenna 1700 is a printed antenna printed on exterior side 1702 of window plug 1102. Wire 1704 connects antenna 1700 to radio 1600. Radio 1600 is a router that may retransmit the signal to antenna 1700.

Figure 18:
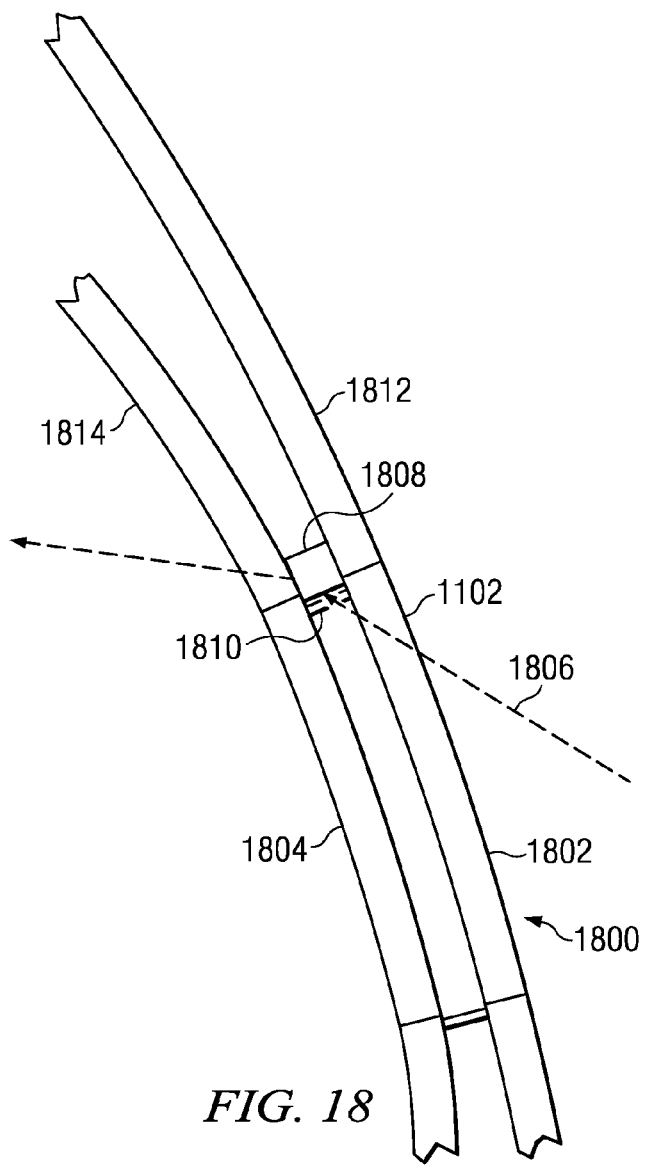
FIG. 18 is yet another configuration for a router in accordance with an advantageous embodiment.

With reference now to FIG. 18, yet another configuration for a router is depicted in accordance with an advantageous embodiment. In this example, window plug 1800 includes transparent pane 1802 and opaque pane 1804. In other words, wireless signals traveling along path 1806 may be transmitted through pane 1802 but may not pass through pane 1804.

As depicted, router 1808 is placed on or near closeout seal 1810 to receive radio frequency signals. Router 1808 is located between fuselage 1812 and side wall 1814. In these examples, side wall 1814 is transparent to the wireless signals and passes wireless signals transmitted by router 1808. This type of arrangement provides another configuration for receiving signals from the exterior of the aircraft and transmitting it into the interior of the aircraft.

The wireless signal paths illustrated in FIGS. 11, 12, 13, 14, 15 and 18 show signals traveling from outside the aircraft to inside the aircraft. These configurations also allow for wireless signals to travel in the opposite direction.

Figure 19:
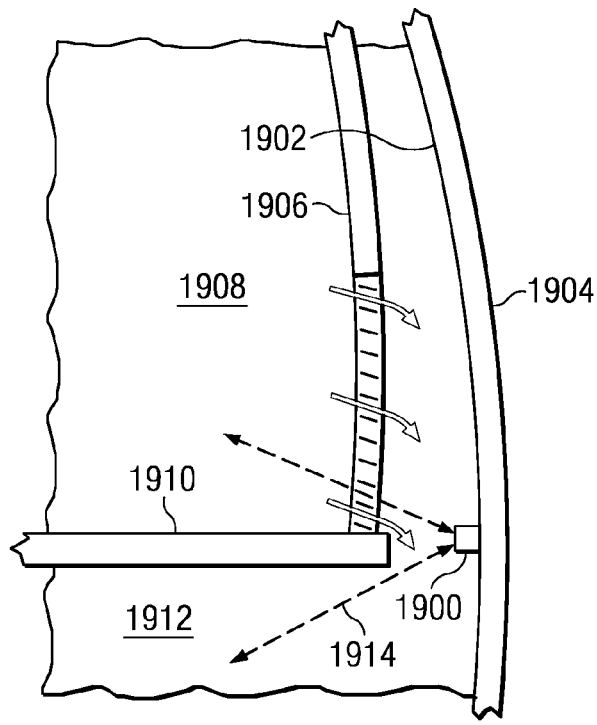
FIG. 19 is a diagram illustrating placement of a return air grill router in accordance with an advantageous embodiment.

With reference now to FIG. 19, a diagram illustrating placement of a return air grill router is depicted in accordance with an advantageous embodiment. In this example, router 1900 is located on surface 1902 of fuselage 1904. Router 1900 is positioned proximate to or in a location relative to grill 1906 such that router 1900 is capable of receiving wireless signals from within passenger cabin 1908 or lower lobe 1912. The signals may originate from sensors or routers located within passenger cabin 1908 from sensors or routers located within lower lobe 1912.

This type of arrangement may be used when floor 1910 is opaque to wireless signals. In other words, wireless signals cannot be transmitted between passenger cabin 1908 and lower lobe 1912 through floor 1910. Router 1900 then retransmits the signals received from passenger cabin 1908 into lower lobe 1912 along path 1914 in these examples, or in the reverse direction. Thus, router 1900 makes use of the return air grill designed airflow path, which is from passenger cabin 1908 to lower lobe 1912, to also provide a convenient route for wireless signal transmission.

The different paths for wireless signals illustrated in the different examples are presented merely for purposes of illustrating one possible path for radio frequency signals. The illustrations of these paths of examples are not intended to limit the manner in which paths may occur. In other words, a router may receive radio frequency signals along multiple paths and transmit those signals along multiple paths.

Also, some of the features above may be combined. For example, a router may be located in the sidewall area or mounted on the back side of the sidewall with this router having an antenna in the window area, such as on the window close-out seal, and an antenna in the return air grill area. Thus, this single router may serve as both a window plug router and a return air grill router. This configuration may provide wireless signal coverage of the exterior, main cabin, and lower lobe and would allow for wireless signal communications between all of these areas.

Figure 20:
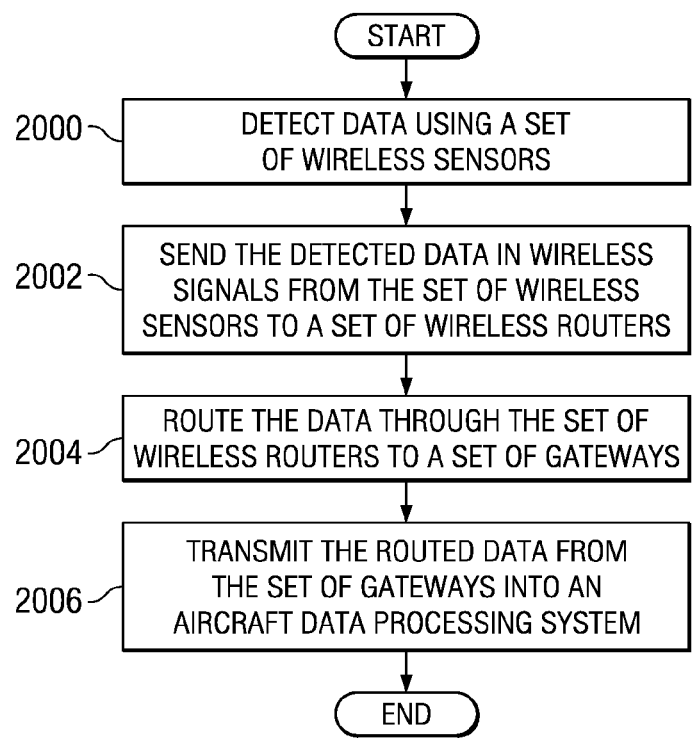
FIG. 20 is a flowchart of a process for processing data in a wireless aircraft sensor network in accordance with an advantageous embodiment.

With reference now to FIG. 20, a flowchart of a process for processing data in a wireless aircraft sensor network is depicted in accordance with an advantageous embodiment. The process illustrated in FIG. 20 may be implemented in a data processing system, such as aircraft network system 300 in FIG. 3.

The process begins by detecting data using a set of wireless sensors (operation 2000). These wireless sensors may be attached to a first set of locations. These locations may be, for example, without limitation, outside the aircraft and inside the aircraft. These sensors may be located on different levels of the aircraft. For example, these sensors may be located in the passenger cabin, in the crown above the passenger cabin, and on a lower lobe on the aircraft. Further, these sensors may be located on another level, such as other passenger cabins if the aircraft has multiple floors of passenger cabins.

The process then sends the detected data and wireless signals from the set of wireless sensors to a set of wireless routers (operation 2002). These wireless routers are located in a second set of locations for the aircraft. These routers may also be outside and inside the aircraft. The data is then routed through the set of wireless routers to a set of gateways (operation 2004). The process then transmits the routed data from the set of gateways into aircraft data processing system (operation 2006), with the process terminating thereafter.

The flowcharts and block diagrams in the different depicted embodiments illustrate the architecture, functionality, and operation of some possible implementations of apparatus, methods and computer program products. In this regard, each block in the flowchart or block diagrams may represent a module, segment, or portion of computer usable or readable program code, which comprises one or more executable instructions for implementing the specified function or functions. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

The different advantageous embodiments can take the form of an entirely hardware embodiment, an entirely software embodiment, or an embodiment containing both hardware and software elements. Some embodiments are implemented in software, which includes but is not limited to forms, such as, for example, firmware, resident software, and microcode.

Furthermore, the different embodiments can take the form of a computer program product accessible from a computer-usable or computer-readable medium providing program code for use by or in connection with a computer or any device or system that executes instructions. For the purposes of this disclosure, a computer-usable or computer readable medium can generally be any tangible apparatus that can contain, store, communicate, propagate, or transport the program for use by or in connection with the instruction execution system, apparatus, or device.

The computer usable or computer readable medium can be, for example, without limitation an electronic, magnetic, optical, electromagnetic, infrared, or semiconductor system, or a propagation medium. Non limiting examples of a computer-readable medium include a semiconductor or solid state memory, magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD-R/W) and DVD.

Further, a computer-usable or computer-readable medium may contain or store a computer readable or usable program code such that when the computer readable or usable program code is executed on a computer, the execution of this computer readable or usable program code causes the computer to transmit another computer readable or usable program code over a communications link. This communications link may use a medium that is, for example without limitation, physical or wireless.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories which provide temporary storage of at least some computer readable or computer usable program code to reduce the number of times code may be retrieved from bulk storage during execution of the code.

Input/output or I/O devices can be coupled to the system either directly or through intervening I/O controllers. These devices may include, for example, without limitation to keyboards, touch screen displays, and pointing devices. Different communications adapters may also be coupled to the system to enable the data processing system to become coupled to other data processing systems or remote printers or storage devices through intervening private or public networks. Non-limiting examples are modems and network adapters are just a few of the currently available types of communications adapters.

The description of the different advantageous embodiments has been presented for purposes of illustration and description, and is not intended to be exhaustive or limited to the embodiments in the form disclosed. Many modifications and variations will be apparent to those of ordinary skill in the art.

Further, the different advantageous embodiments may be implemented in vehicles other than aircraft. For example, the different advantageous embodiments may be implemented in vehicles, such as, for example, trains, surface ships, submarines, busses, spacecraft, and other suitable vehicles. The different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An aircraft for collecting data about the aircraft, the aircraft comprising:
    a set of wireless sensors attached to a first set of locations of the aircraft, wherein the set of wireless sensors are configured to collect data about the aircraft and wirelessly transmit the data as wireless signals;
    a set of wireless routers attached to a second set of locations of the aircraft, wherein the set of wireless routers is configured to receive the data in wireless signals transmitted by the set of wireless sensors, wherein the set of wireless routers comprises a first wireless router, a second wireless router, and a third wireless router;
    a window plug attached to the aircraft, the window plug comprising a first pane of material configured to pass the wireless signals and a second pane of material configured to substantially block the wireless signals;
    wherein the first wireless router is located on the aircraft in a first location such that the first wireless router is configured to receive the wireless signals directly from at least some of the set of wireless sensors through the first pane of material;
    wherein the second wireless router is located on the aircraft in a second location from which the second wireless router is configured to receive the wireless signals from the first wireless router;
    wherein the third wireless router is located on the aircraft in a third location that is on an opposite side of the second pane of material from the first wireless router from which the third wireless router is configured to receive the wireless signals from the second wireless router, and wherein the third wireless router is further located on the aircraft such that the second pane substantially blocks the wireless signals from being transmitted directly from the set of sensors to the third wireless router; and
    wherein the third wireless router is configured to route the wireless signals to a data processing system of the aircraft, wherein the data processing system is located on the aircraft in a location from which the second pane substantially blocks the wireless signals from being transmitted directly from the set of sensors to the data processing system.

2. The aircraft of claim 1, wherein the first pane is attached to a fuselage of the aircraft and the second pane is connected to a sidewall within the aircraft, a gap is present between the first pane and the second pane, a seal is present between edges of the first pane and the second pane, and the first wireless router is coupled to the seal.

3. The aircraft of claim 1 wherein a wireless sensor in the set of wireless sensors comprises:
    a sensor;
    a processor connected to the sensor;
    a transmitter connected to the processor; and
    a power source capable of providing power to the sensor, processor, and transmitter.

4. The aircraft of claim 3, wherein the power source is selecting from one of a battery, a capacitor, and an energy harvesting device.

5. The aircraft of claim 4, wherein the energy harvesting device is selected from one of a photovoltaic device, a vibration harvesting device, and a thermoelectric device.

6. The aircraft of claim 1 wherein a first portion of the set of wireless routers is located outside of the aircraft and a second portion of the set of wireless routers is located inside the aircraft.

7. The aircraft of claim 1 further comprising:
    a set of gateways on the aircraft, and wherein the set of gateways are configured to receive the wireless signals from the third wireless router and communicate the wireless signals to the data processing system.

8. The aircraft of claim 1 wherein the data processing system is selected from one of a line replaceable unit, an in flight entertainment system, and an environmental control system.

9. A method for detecting data in an aircraft, the method comprising:
    detecting the data using a set of wireless sensors attached to a first set of locations of the aircraft to form detected data;
    sending the detected data in wireless signals from the set of wireless sensors to a set of wireless routers attached to a second set of locations of the aircraft, wherein the set of wireless routers receives the data in the wireless signals transmitted by the set of wireless sensors, wherein sending comprises
    sending the wireless signals to a first wireless router in the set of wireless routers through a first pane of material of a window plug that is configured to pass the wireless signals;
    sending the wireless signals from the first wireless router to a second wireless router in the set of wireless routers; and sending the wireless signals from the second wireless router to a third wireless router in the set of wireless routers that is on an opposite side of a second pane of the window plug from the first wireless router, wherein the second pane substantially blocks the wireless signals;
    routing the detected data through the set of wireless routers to a set of gateways connected to an aircraft data processing system to form routed data; and
    transmitting the routed data from the set of gateways into the aircraft data processing system.

10. The method of claim 9, wherein the aircraft includes a first level and a second level separated by a floor wherein the routing step comprises:

transmitting the detected data from a first level of the aircraft to a second level of the aircraft a using a fourth wireless router in the set of wireless routers located in a position allowing the fourth wireless router to receive a wireless signal through a transparent section in a cabin sidewall to form a received wireless signal and allowing the fourth wireless router to transmit the received wireless signal to a fifth wireless router in the set of wireless routers on the second level.

11. The method of claim 9, wherein at least some of the set of wireless sensors are located on and outside of the aircraft.

12. The method of claim 9, wherein at least some of the set of wireless sensors are located inside the aircraft.

13. The method of claim 9, wherein a first portion of the set of wireless sensors are located inside the aircraft, and wherein a second portion of the set of wireless sensors are located outside the aircraft.

* * * * *